UNITED STATES PATENT OFFICE.

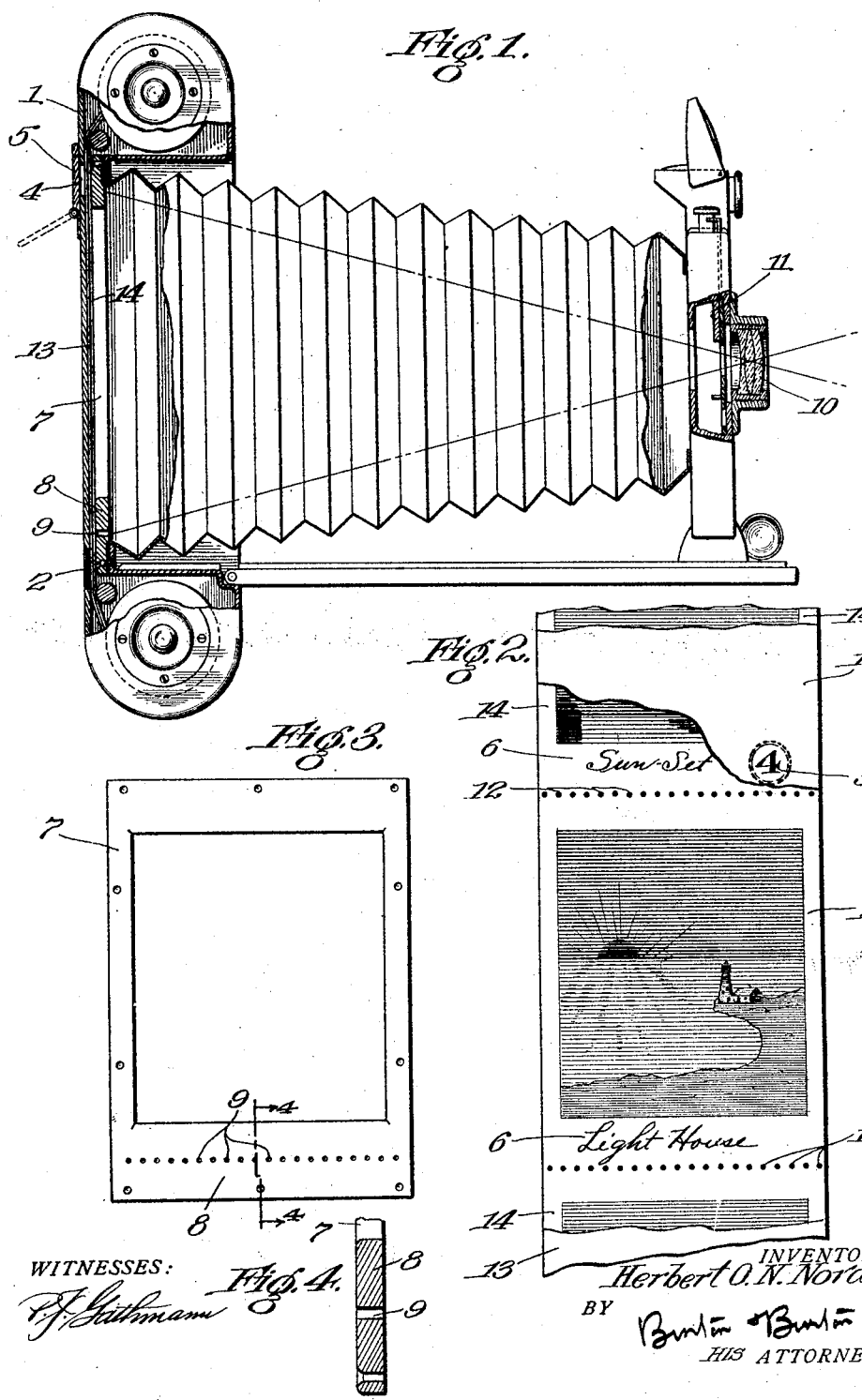

HERBERT O. N. NORDIN, OF CHICAGO, ILLINOIS.

FILM MARKER.

1,411,370.  Specification of Letters Patent.  Patented Apr. 4, 1922.

Application filed May 10, 1920. Serial No. 380,022.

*To all whom it may concern:*

Be it known that I, HERBERT O. N. NORDIN, citizen of the United States, residing in the city of Chicago, county of Cook, and State of Illinois, have invented certain new and useful Improvements in Film Markers, of which the following is a specification, reference being had to the accompanying drawings, forming a part thereof.

The purpose of this invention is to provide an improved device of the nature of a marker for photographic films for distinguishing the space occupied on the film by one exposed portion from the next. The invention is directed to producing such marking on the sensitized side of the film and by means of the light admitted through the lens in "exposing" the film to produce a negative image thereon; and it consists in certain features and elements of construction hereinafter shown and described as indicated by the claims.

In the drawings:

Figure 1 is a side elevation partly in section showing a roll film camera embodying this invention, with the bellows extended in position for making an exposure.

Figure 2 is a view of a portion of the exposed film showing the markings produced thereon, in relation to the images or pictures made coincidently therewith.

Figure 3 is a detail view of the device which produces the marking.

Figure 4 is a section at the line, 4—4, on Figure 3.

The drawings show a roll film camera of the folding type and of familiar design which need not be described in detail beyond indicating that it may include in the back of the box, 1, an opening, 2, for exposing the usual designating characters, 3, printed on the paper backing, 13, to indicate and position each of the successive image areas of the film, 14.

There is also illustrated at 4, a window and a closure, 5, therefor, which may be understood as constituting the means of access to the film in a so-called "autographic" camera, for the purpose of applying a title or other designation to the film as indicated at 6, in Fig 2.

It frequently happens that in cutting a film preparatory to giving separate developing treatment to the several exposures thereon, the cut may be made inadvertently through an image, or, at least, a considerable amount of time is taken up in determining exactly the proper line of separation; and especially when a written title or other autographic marking accompanies each exposure, is is often difficult to make sure as to which picture should be left associated with the title.

As shown in the drawings there is a rectangular frame, 7, located between the lens and the film and immediately in front of the latter, said frame, 7, having a rectangular opening through which the film is exposed to the image formed by the lens, such opening thus defining what may be termed an "image area" of the film. By the usual reeling devices the film is fed past the back of the frame, 7, for successively registering adjacent image areas at the opening.

For the purpose of providing on the film itself an indication of the correct line of separation between the images registered thereon, and also insuring that the autographed title, if there be one, shall be included with the proper picture when the film is cut, the transverse bar or portion, 8, of the frame, 7, forming one end thereof, and which lies across the film adjacent one end of the image area, is perforated with a series of apertures, 9, which are preferably arranged in a straight line at right angles to the direction of feed of the film. This portion, 8, of the frame, 7, being covered by the light admitted into the bellows through lens, 10, when shutter, 11, is opened, it will be seen that when the image area of the film is exposed in producing a negative, the film is also exposed to the actinic action of the light through the apertures, 9, resulting in a row of black dots, 12, across the film after chemical development thereof.

This line being produced on the film before the image area has been moved from its image-receiving position, in fact, simultaneously with the production of the image thereon, is bound to bear the proper space relation thereto; and being a little apart from the image itself, the line of dots, 12, will be readily recognized when it is desired to cut up the film into separate negatives. Furthermore, the marking becomes entirely automatic and therefore, with the element of human error eliminated, it may always be relied upon.

I claim:

1. In combination with a camera having means for mounting a roll film therein, a plate or frame formed with an opening for exposing an image area of the film to light directed thereon by the lens of the camera, said frame being further apertured adjacent one margin of said opening to expose a transverse line on the film coincidently with the exposure of the image area.

2. In combination with a camera having means for mounting a roll film therein, a film marker within the bellows chamber comprising a fixed member arranged to lie proximate to the film and formed with a row of apertures extending parallel to the roll spool axis for exposing a line on the film coincidently with the exposure of the image area and adjacent thereto.

3. In combination with a camera having means for mounting a roll film therein, each of the several image areas thereof having an associated number observable at an aperture in the box of the camera when the area is correctly adjusted for exposure therein, a film marker within the bellows chamber comprising a bar arranged to lie against the film and apertured to expose a line thereon parallel to the roll spool axis at the extreme limit of film area corresponding to the adjusted image area when the light is admitted for exposure of said image area.

4. In combination with a camera arranged for mounting a roll film and having a lens for successively exposing sections of such film each constituting an image area, together with means for autographing the film adjacent each image area thereof while the latter is adjusted in position for exposure, a film marker within the bellows chamber comprising an apertured mask contiguous to the film positioned to register with a part adjacent the extreme limit of image area when the same is adjusted for exposure, said marker being adapted to operate by the light admitted for exposure of said image area and simultaneously therewith.

5. In the combination defined in claim 4, the said mask having a row of apertures extending parallel to the roll spool axis for exposing a transverse line on the film to indicate the limit of area corresponding to the simultaneously exposed image and the autograph associated therewith.

In testimony whereof, I have hereunto set my hand at Chicago, Illinois, this 5th day of May, 1920.

HERBERT O. N. NORDIN.